Jan. 2, 1940.  J. O. HEINZE  2,185,631
INTERMITTENT LUBRICATING DEVICE
Filed Jan. 28, 1938  2 Sheets-Sheet 2
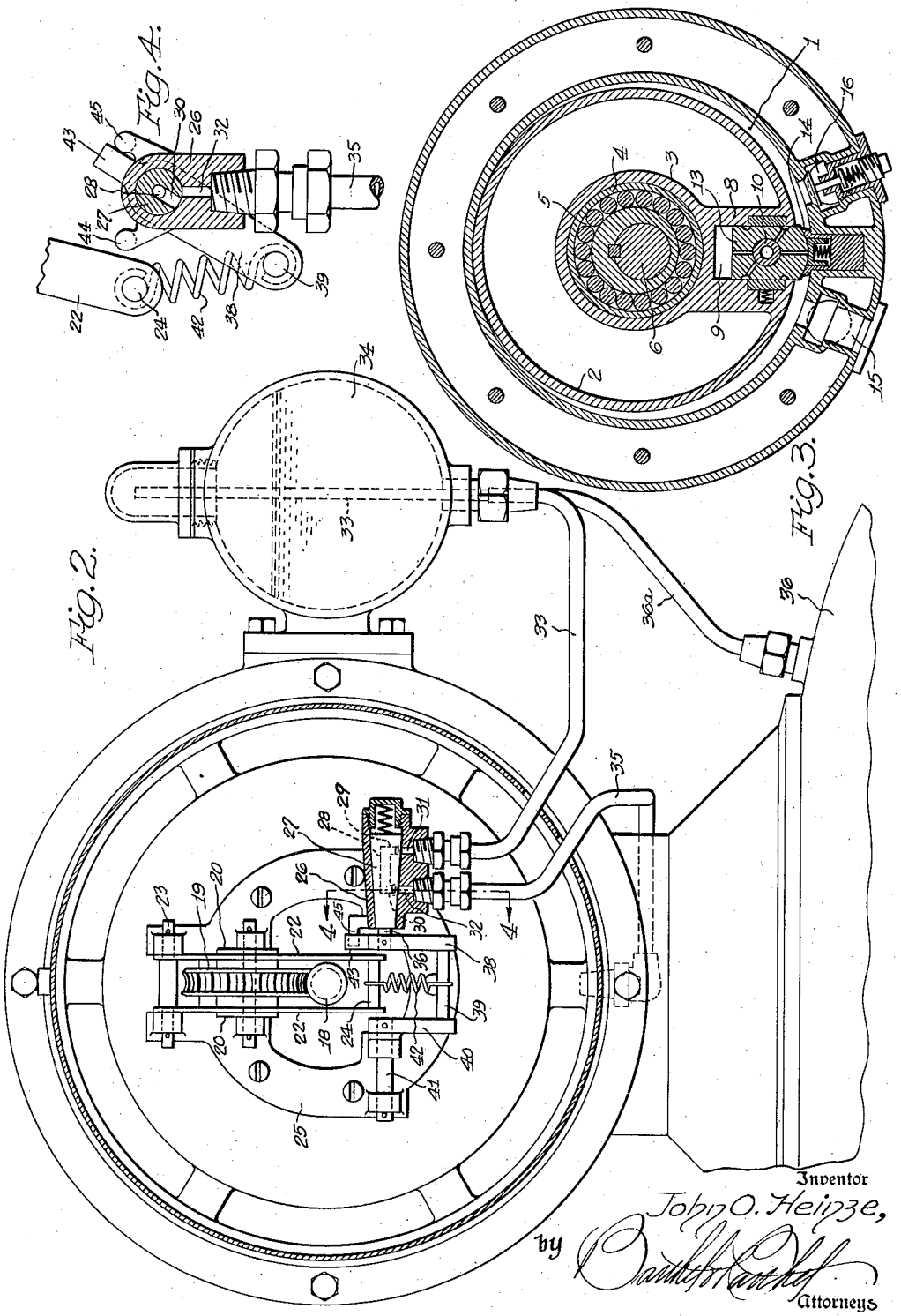
Inventor
John O. Heinze,
by
Attorneys Patented Jan. 2, 1940

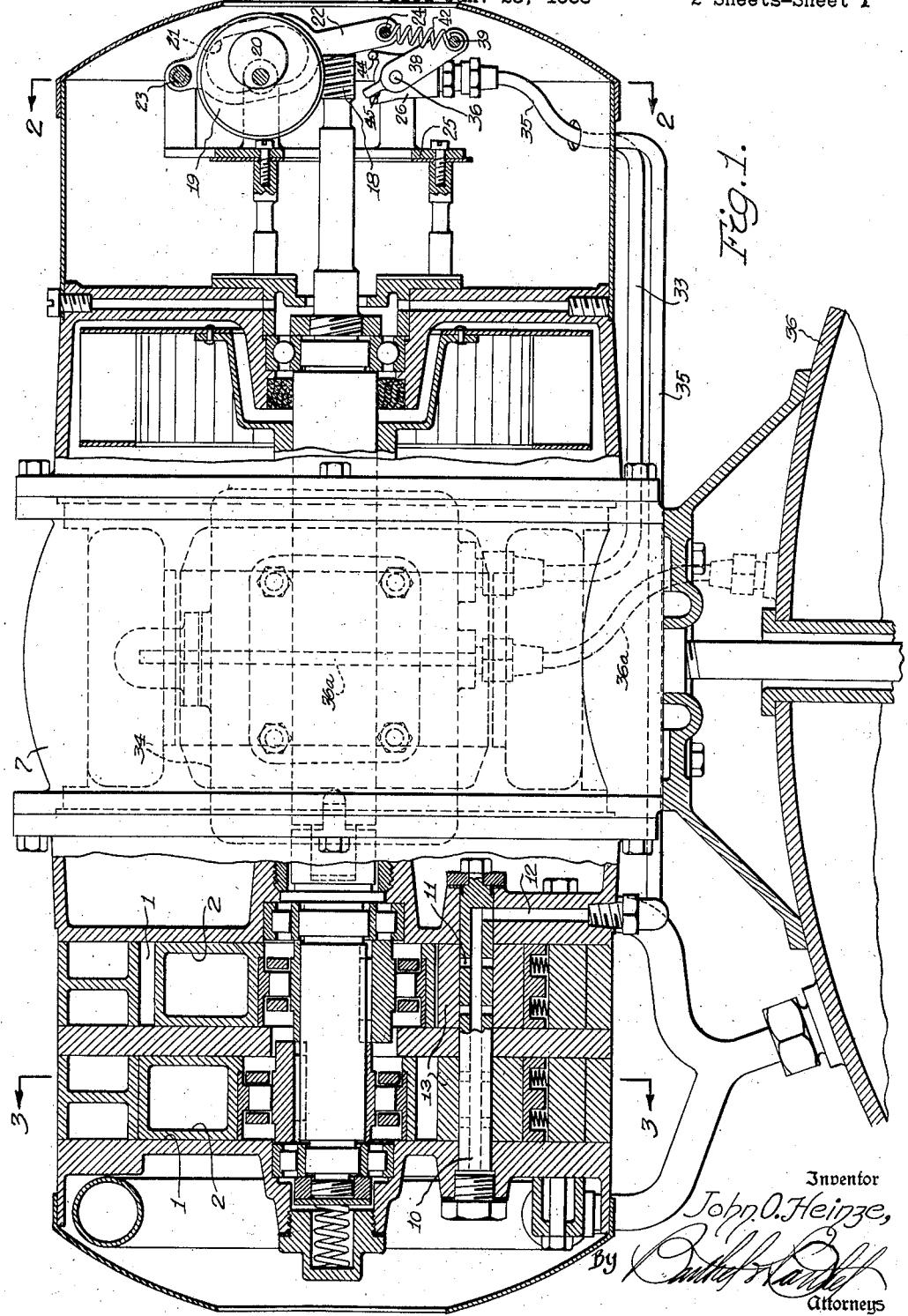

2,185,631

UNITED STATES PATENT OFFICE 2,185,631

INTERMITTENT LUBRICATING DEVICE

John O. Heinze, Detroit, Mich., assignor to Heinze Development Company, Detroit, Mich., a corporation of Michigan Application January 28, 1938, Serial No. 187,393

6 Claims. (Cl. 184—34)

This invention relates to intermittently operating lubricating means and has for its primary object to provide means for intermittently supplying lubricant in regulated amounts to the relatively moving parts of engines, compressors, pumps and like machinery.

An important object of the invention is to provide a pressure lubricating device which is especially adapted for use in conjunction with air compressors such as are employed to supply air under pressure to storage tanks, from which the air is subsequently withdrawn. In such air compressor combinations, the back pressure varies as the air pressure in the tanks varies, and in order to provide efficient lubrication the lubricant pressure must vary also. With this in view, the invention has as a more specific object to vary the pressure under which the lubricant is supplied, whereby under low back pressure conditions the lubricant is supplied under low pressure, and whereby under high back pressure conditions the lubricant is supplied under high pressure. In this manner, an adequate supply of lubricant is present during operation of the compressor under high pressure conditions, and during low pressure operating conditions the lubricant pressure is decreased to prevent excessive accumulation of lubricant in the compressor.

Another object of the invention is to provide lubricating means of the character above referred to wherein the air pressure in the air storage tank is transmitted to a lubricant reservoir to maintain the lubricant under pressure, and valve means operated in timed relation to the compressor for controlling the flow of lubricant from the reservoir to the compressor.

Another important object of the invention is to provide apparatus of the character above referred to embodying means for preventing the flow of lubricant from a supply means wherein the lubricant is maintained under pressure to the machine to be lubricated, when said machine is inoperative. In this respect the invention prevents flooding of the lubricated machine with an excessive amount of lubricant when the machine is inoperative.

An important object of the invention is to provide intermittent lubricating means operable automatically incident to the operation of the machine upon which it is mounted and at a rate having a fixed relationship with the rate of operation of the machine, for supplying lubricant in regulated amounts to the moving parts of the machine. That is, at predetermined stages in the cycle of operation of the machine the lubricating means supplies a measured quantity of lubricant, and the amount of lubricant supplied over a given period varies according to the speed of operation of the machine. Therefore, an adequate supply of lubricant is always present during high speed operation of the machine, and during operation of the machine at slower speeds the lubricant supply is correspondingly decreased whereby flooding of the machine with an excessive accumulation of lubricant is prevented.

With the above and other ends in view the invention is more fully disclosed with reference to the accompanying drawings, in which Figure 1 is a vertical longitudinal section of a compressor equipped with the present lubricating means;

Fig. 2 is a section taken on the line 2—2 of Fig. 1;

Fig. 3 is a section taken on the line 3—3 of Fig. 1, and

Fig. 4 is a section taken on the line 4—4 of Fig. 2.

Like characters of reference are employed throughout to designate corresponding parts.

The invention is shown by way of example in conjunction with a compressor embodying a pair of cylinders 1 receiving circular, disk-like pistons 2. The pistons 2 are formed with hollow hub portions 3 receiving wear resisting rings 4, and roller bearings 5 are interposed between the rings 4 and diametrically opposed eccentric portions fixedly arranged on a shaft 6, the shaft being connected to an electric motor 7 for operation thereby.

Each piston 2 has an internal radial formation 8 with a slot 9 therein and a tubular pivot pin 10 extends through the two cylinders 1 and the slots 9 of the pistons. The tubular pivot pin is rigidly secured with respect to the cylinder formations and has radial ports 11 for discharging lubricant. The lubricant is supplied to the tubular pivot pin through a passage 12 by mechanism which is hereinafter described.

Mounted upon the tubular pivot pin 10, within the slot 9 of each piston, is a bearing block 13 which is movable relative to the walls of the slot. The ends of respective blocks 13 are formed concentric with the axis of the pivot pin 10 whereby they closely fit abutment members 14. Opening into the cylinders 1, on one side of the abutments 14, are air inlet passages 15, and on the other side of respective abutments are check valve controlled outlet ports 16.

Upon rotation of the shaft 6 the eccentric oscillations of the pistons 2, caused by the eccentric portions on said shaft, cause air to be drawn into the cylinders through the ports 15 and to be discharged through the ports 16. This operation is known to the art, and is not treated in detail here, inasmuch as it serves only to provide the setting for the invention hereinafter described. For a more detailed description of a compressor of the type above referred to attention is invited to my prior Patent 2,076,723, issued April 13, 1937, wherein the compressor construction here referred to is shown and claimed.

Connected to the shaft of the motor 7 is a worm 18 which operates a worm gear 19 having eccentrics 20 secured thereto and disposed in slots 21 of a pair of parallel levers 22. The levers 22 are supported at their upper ends by a pivot 23, and are united at their lower ends by a pin 24 whereby the two free ends thereof swing in unison. It is apparent that rotation of the eccentrics imparts swinging movement to the levers 22, and inasmuch as the eccentrics are rotated by the same motor which operates the pistons 2, the lever movements have a definitely timed relationship with the piston movements.

Supported by the same frame structure 25 which supports the worm gear 19 and eccentrics 20 is a valve 26 having a rotatable plug 27 therein. The valve plug 27 has an axial passage 28 and two radial ports 29 and 30, spaced longitudinally of the plug and adapted to register, respectively, with ports 31 and 32 in the valve body 26. The port 31 is connected by a conduit 33 to a lubricant reservoir 34, and the port 32 is connected by a conduit 35 to the above described passage 12.

The entire structure above described, including the compressor and motor, is mounted upon an air storage tank 36 and the air compressed by the compressor is stored in said tank. The tank 36 is connected by a conduit 36a to the reservoir 34. The air pressure in the tank 36 may be utilized, therefore, to force lubricant from the reservoir 34, through the conduit 33 to the valve, and when ports 29 and 30 are in register, respectively, with ports 31 and 32 the lubricant passes through the conduit 35 to the tubular pivot 10, from which it passes to the moving parts of the compressor. However, the radial ports 29, 30, 31 and 32 are of comparatively small diameter in order that the lubricant flow can only take place during a small fraction of a revolution of said valve plug.

The swinging or oscillating levers 22 constitute means for oscillating the valve plug and for preventing the plug from stopping at a point where the ports 29 and 30 are in register with respective ports 31 and 32. To this end, the valve plug 27 has a stem 36 with a radially extending arm 38. On the swinging end of the arm 38 is a pin 39, and supported on said pin in spaced relation to said arm is a similar arm 40 pivoted at 41 co-axially with the axis of the plug 27. The levers 22 are related to the valve whereby they swing between the arms 38 and 40, and the pin 24 carried by the levers 22 is connected to the pin 39 by a spring 42. The arm 38 has an extension 43 adapted to engage stops 44 and 45 on the valve body to restrict swinging movement of the arm 38 and, therefore, the extent of the valve plug oscillations.

Upon reference to Fig. 1 it will be noted that the levers 22 in swinging toward the left hand side exert a force on the pin 39 tending to hold the arm 38 stationary until such time as they swing to a position where the line of said force passes the axis of the stem 36. When this occurs the arm 38 is snapped to the position shown in Fig. 4, causing the valve plug to oscillate, and the ports 29 and 30 to register momentarily with the ports 31 and 32 respectively. As the levers 22 swing back to the position shown in Fig. 1 the ports again register momentarily and, therefore, with each rotation of the eccentrics 20 two charges of lubricant are supplied to the compressor. By varying the size of the worm gear 19 and worm 18 any desired time relationship may be provided between oscillations of the compressor pistons and the lubricant charges, but throughout all variations the intervals between lubricant charges are dependent upon the speed of operation of the compressor. When the compressor is inoperative, the lubricant supply ceases, although the lubricant reservoir may remain under pressure.

Although a specific embodiment of the invention has been illustrated and described, it will be understood that various changes may be made without departing from the spirit of the invention as defined by the appended claims, and such changes are contemplated.

What I claim is:

1. In combination, a motor, a device driven by said motor and having means for receiving lubricant, a lubricant supply means, a valve body having an inlet connected with said supply means and an outlet connected with said receiving means, a member in said body movable in reverse directions and having means for establishing communication between said inlet and outlet during predetermined stages in its reverse movement and for preventing communication when at either limit of reverse movement, and means operated by said motor for imparting reverse movements to said member.

2. In combination, a motor, a device driven by said motor and having means for receiving lubricant, a lubricant supply means, a valve body having an inlet connected with said supply means and an outlet connected with said receiving means, a member in said body movable in reverse directions and having means for establishing communication between said inlet and outlet during predetermined stages in its reverse movements and for preventing communication when at either limit of reverse movement, spring means for imparting reverse movements to said member, and means operated by said motor for storing energy in said spring means whereby it functions at predetermined stages in the cycle of operation of said motor driven device.

3. In combination, an air compressor, a motor for operating said compressor, means for receiving the compressed air from said compressor, a lubricant reservoir, means connecting said receiving means with said reservoir whereby the air pressure tends to displace the lubricant from said reservoir, a valve body having an inlet connected to said reservoir and an outlet adapted to be connected to a lubricant dispensing means in said compressor, a member in said body movable in reverse directions and having means for establishing communication between said inlet and outlet during predetermined stages in its movements and for preventing communication when at either limit of its movement, and means operated by said motor for imparting reverse movements to said member.

4. In combination, an air compressor, a motor for operating said compressor, means for receiving the compressed air from said compressor, a lubricant reservoir, means connecting said means with said reservoir whereby the air pressure tends to displace the lubricant from said reservoir, a valve body having an inlet adapted to be connected to said reservoir and an outlet adapted to be connected to a lubricant dispensing means in said compressor, a member in said body movable in reverse directions and having means for establishing communication between said inlet and outlet during predetermined stages in its movements and for preventing communication when at either limit of its movement, spring means for imparting reverse movements to said member, and means operated by said motor for storing energy in said spring means whereby it functions at predetermined stages in the cycle of operation of said compressor.

5. In combination, a motor, a device driven by said motor and having means for receiving lubricant, a lubricant supply means, a valve body having an inlet connected with said supply means and an outlet connected with said receiving means, a member in said body movable in reverse directions and having means for establishing communication between said inlet and outlet during predetermined stages in its reverse movements and for preventing communication when at either limit of reverse movement, a swinging actuator for said member, a swinging member mounted whereby its swinging end crosses the swinging axis of said actuator, a spring connecting the swinging end of the actuator to the swinging end of said swinging member, and means operated by said motor for swinging said swinging member.

6. In combination, an air compressor, a motor for operating said compressor, means for receiving the compressed air from said compressor, a lubricant reservoir, means connecting said means with said reservoir whereby the air pressure tends to displace the lubricant from said reservoir, a valve body having an inlet adapted to be connected to said reservoir and an outlet adapted to be connected to a lubricant dispensing means in said compressor, a member in said body movable in reverse directions and having means for establishing communication between said inlet and outlet during predetermined stages in its movements and for preventing communication when at either limit of its movement, a swinging actuator for said member, a swinging member mounted whereby its swinging end crosses the swinging axis of said actuator, a spring connecting the swinging end of the actuator to the swinging end of said swinging member, and means operated by said motor for swinging said swinging member.

JOHN O. HEINZE.